(12) United States Patent
Tran et al.

(10) Patent No.: US 8,163,059 B2
(45) Date of Patent: Apr. 24, 2012

(54) COATING OIL COMPRISING BY-PRODUCTS FROM THE MANUFACTURE OF FATTY ACID ALKYL ESTERS AND/OR BIODIESEL

(75) Inventors: Bo L. Tran, Chicago, IL (US); Theodore C. Arnst, Bellaire, TX (US); Patrick C. Miller, Naperville, IL (US); Dmitri L. Kouznetsov, Aurora, IL (US)

(73) Assignee: Nalco Company, Naperville, IL (US)

( * ) Notice: Subject to any disclaimer, the term of this patent is extended or adjusted under 35 U.S.C. 154(b) by 570 days.

(21) Appl. No.: 11/673,747

(22) Filed: Feb. 12, 2007

(65) Prior Publication Data
US 2008/0190160 A1    Aug. 14, 2008

(51) Int. Cl.
*A01N 25/26* (2006.01)
*C09K 3/22* (2006.01)
*B32B 21/02* (2006.01)
*B32B 9/04* (2006.01)

(52) U.S. Cl. .................. 71/64.07; 71/33; 71/34; 71/50; 71/51; 71/53; 71/58; 71/59; 71/60; 71/61; 71/63; 71/64.12; 252/384; 427/220

(58) Field of Classification Search ............... 71/64.12, 71/33, 34, 50, 51, 53, 58, 59, 60, 61, 63, 71/64.07; 106/243; 428/403; 427/212, 220; 252/384

See application file for complete search history.

(56) References Cited

U.S. PATENT DOCUMENTS

| | | | | |
|---|---|---|---|---|
| 3,305,491 | A * | 2/1967 | Oster | 252/384 |
| 3,837,835 | A * | 9/1974 | Weinrotter et al. | 71/59 |
| 3,926,841 | A * | 12/1975 | Habasko et al. | 252/383 |
| 4,185,988 | A * | 1/1980 | Kistler et al. | 71/27 |
| 5,203,906 | A * | 4/1993 | Schapira et al. | 71/64.12 |
| 5,364,440 | A * | 11/1994 | Schapira et al. | 71/64.12 |
| 5,472,476 | A * | 12/1995 | Schapira et al. | 71/64.12 |
| 5,704,962 | A * | 1/1998 | Navascues | 71/64.07 |
| 5,968,222 | A | 10/1999 | Kodali | |
| 6,475,259 | B1 | 11/2002 | Thomas et al. | |
| 6,514,331 | B2 * | 2/2003 | Varnadoe et al. | 106/269 |
| 6,514,332 | B2 * | 2/2003 | Varnadoe et al. | 106/269 |
| 6,776,832 | B2 * | 8/2004 | Spence et al. | 106/243 |
| 7,108,800 | B2 * | 9/2006 | Tran et al. | 252/70 |
| 7,398,935 | B2 * | 7/2008 | Tran et al. | 241/16 |

FOREIGN PATENT DOCUMENTS

EP    1627865    *    2/2006

* cited by examiner

*Primary Examiner* — Wayne Langel
(74) *Attorney, Agent, or Firm* — Benjamin E. Carlsen; Michael B. Martin

(57) ABSTRACT

A coating oil composition and methods of using the composition for dust control is provided. The coating oil comprises utilizing a by-product from the manufacture of biodiesel and/or fatty alkyl esters, wherein the by-product comprises $C_6$-$C_{24}$ saturated and unsaturated fatty acids, $C_6$-$C_{24}$ saturated and unsaturated fatty acid salts, methyl esters, ethyl esters and combinations thereof.

18 Claims, No Drawings

COATING OIL COMPRISING BY-PRODUCTS FROM THE MANUFACTURE OF FATTY ACID ALKYL ESTERS AND/OR BIODIESEL

TECHNICAL FIELD

This invention relates to a coating oil composition comprising fatty acid and fatty acid ester by-products derived from the manufacture of fatty acid alkyl esters and/or biodiesel. More particularly, this invention concerns coating oil used to suppress dust utilizing a by-product that is green and is derived from renewable sources. The by-product comprises $C_6$-$C_{24}$ fatty acids and salts and esters thereof. The coating oil composition reduces dust formation and cake formation in particulate solids, especially fertilizers.

BACKGROUND OF THE INVENTION

Dust control methods are practiced in many industries performing solids handling. Dust control is required to protect the health and safety of workers, the integrity of the environment, and to mitigate the loss of valuable product.

For example, during the production of dry granular fertilizer there are mechanical conveyance steps that generate small particles of fertilizer that can be transported to undesirable locations by stray air currents. If the particle size is small enough the dust can remain suspended in the air for extended periods of time which can lead to the aforementioned safety, health and environmental problems.

Cake formation also presents problems in handling of bulk materials. In the case of fertilizer, the material is produced nearly continuously during the year, but the consumption is intermittent with the cycles of agriculture. As such, produced fertilizer is subject to storage in large piles within large barns. During these storage periods, a combination of factors (pressure, humidity, residual moisture, temperature cycles, etc.) can promote adhesion of the individual granules to form large, hard lumps, the undesired condition referred to as "caking".

Coating the granular fertilizer with natural or petroleum oils or waxes is a historically established method for controlling dust and caking phenomena. Coating oil compositions for fertilizer comprising fatty acid methyl esters and bituminous materials such as asphalt, asphaltic tars, asphaltic pitches, coal tars, coal pitches, and the like are disclosed in U.S. Pat. Nos. 6,514,331 and 6,514,332. U.S. Pat. No. 6,776,832 discloses a coating oil composition comprising an oxidized oil in combination with a diluent where the diluents include methyl and ethyl esters of fatty acids, oils, and combinations thereof, glycerol and polyglycerol esters of fatty acids, oils and combinations thereof and light petroleum oil.

SUMMARY OF THE INVENTION

This invention relates to a novel and cost effective coating oil and methods of using the coating oil. The coating oil comprises a by-product from the manufacture of fatty acid alkyl esters and/or biodiesel.

In an embodiment, this invention is a coating oil composition comprising a by-product from a biodiesel manufacturing process or transesterification reactions involving triglycerides, wherein said by-product comprises one or more $C_6$-$C_{24}$ fatty acids and salts thereof and one or more $C_6$-$C_{24}$ fatty acid esters.

In another embodiment, this invention is a method of controlling the generation of dust from particulate materials comprising applying to said particulate materials an effective dust-controlling amount of a by-product from a biodiesel manufacturing process or transesterification reactions involving triglycerides, wherein said by-product comprises one or more $C_6$-$C_{24}$ fatty acids and salts thereof and one or more $C_6$-$C_{24}$ fatty acid esters.

In another embodiment, this invention is a coated particulate solid comprising particles having an outer surface at least partially coated with a coating oil composition, the coating oil composition comprising a by-product from a biodiesel manufacturing process or transesterification reactions involving triglycerides, wherein said by-product comprises one or more $C_6$-$C_{24}$ fatty acids and salts thereof and one or more $C_6$-$C_{24}$ fatty acid esters.

This invention provides a green product derived from renewable resources to control dust and caking. Moreover, the coating oil composition is cost-effective as it is a by-product from manufacturing biodiesel and/or fatty acid alkyl esters.

DETAILED DESCRIPTION OF THE INVENTION

This invention provides a unique coating oil composition which comprises by-products derived from biodiesel manufacturing processes or transesterification reactions involving triglycerides. The by-product can contain fatty acid esters, especially methyl and ethyl esters, glycerin, free fatty acids and their salts, glycerides and inorganic salts. The invention is green chemistry, meaning that it is non-hazardous, non-toxic, biodegradable, environmentally friendly, and/or derived from a renewable source. Renewable sources can include virgin vegetable oils (soybean, corn, mustard, canola, coconut, rapeseed, palm, sunflower, and the like), recycled vegetable oils, poultry offal, fish oils, used cooking oils, and/or trap greases, and the like.

In an embodiment, the coating oil composition is generated from the manufacture of biodiesel. Biodiesel is a cleaner-burning diesel replacement fuel made from natural, renewable sources. For example, biodiesel can include fatty acid alkyl esters used as a cleaner-burning diesel replacement fuel made from sources such as new and used vegetable oils, and animal fats.

According to the American Fuel Data Center of the U.S. Department of Energy, approximately 55% of the biodiesel is currently produced from recycled fat or oil feedstock, including recycled cooking grease. The other half of the industry is limited to vegetable oils, the least expensive of which is soy oil. The soy industry has been the driving force behind biodiesel commercialization because of excess production capacity, product surpluses, and declining prices. Similar issues apply to the recycled grease and animal fats industry, even though these feedstocks are less expensive than soy oils. Based on the combined resources of both industries, there is enough of the feedstock to supply 1.9 billion gallons of biodiesel.

Biodiesel is typically made through a chemical process called transesterification in which vegetable oil or animal fats are converted to fatty acid alkyl esters and glycerin by-products. Fatty acids and fatty acid alkyl esters can be produced from oils and fats by base-catalyzed transesterification of the oil, direct acid-catalyzed esterification of the oil and conversion of the oil to fatty acids and subsequent esterification to biodiesel.

The majority of fatty acid alkyl esters are produced by the base-catalyzed method. In general, any base may be used as the catalyst used for transesterification of the oil to produce biodiesel, however sodium hydroxide or potassium hydroxide are used in most commercial processes.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel and the oils and fats are added. The system can then be closed, and held at about 71° C. (160° F.) for a period of about 1 to 8 hours, although some systems are operated at room temperature.

Once the reactions are complete the oil molecules (e.g. triglycerides) are hydrolyzed and two major products are produced: 1) a crude fatty acid alkyl esters phase (i.e. biodiesel phase) and 2) a glycerin by-product phase. Typically, the crude fatty acid alkyl esters phase forms a layer on top of the denser glycerin by-product phase. Because the glycerin by-product phase is denser than the biodiesel phase, the two can be gravity separated. For example, the glycerin by-product phase can be simply drawn off the bottom of a settling vessel. In some cases, a centrifuge may be employed to speed the separation of the two phases.

The invention by-product can originate from the refining of the crude fatty acid alkyl esters phase and/or the crude glycerin phase during the biodiesel manufacturing process. For example, the crude fatty acid alkyl esters phase typically includes a mixture of fatty acid alkyl esters, water and a fatty acid salts component. These fatty acid salts component generally form a solution with the water phase (e.g. soap water) where they can be further separated from the fatty acid alkyl esters component. Once separated from the fatty acid alkyl esters component, any suitable acid such as, for example, hydrochloric acid can be added to the water phase containing the fatty acid salts component to produce the by-product of the present invention.

Similarly, the crude glycerin phase typically includes a mixture of glycerin, water and a fatty acid salts component. This fatty acid salts component forms a solution or suspension with the water phase where it can be further separated from the glycerin component by adding any suitable acid to recover the invention by-product.

It should be appreciated that the present invention can be derived from the acidulation of any of the biodiesel manufacturing process streams/stages that contain the fatty acid salts component (e.g. soap water) including, for example, the wash water.

In an embodiment, the by-product comprises about 20 percent to about 95 percent by weight of $C_6$-$C_{24}$ fatty acid esters. The fatty acid esters may be saturated or unsaturated. Representative fatty acid esters include methyl and ethyl esters of myristic acid, myristoleic acid, pentadecanoic acid, palmitic acid, palmitoleic acid, margaric acid, stearic acid, oleic acid, linoleic acid, linolenic acid, arachidic acid, behenic acid, eicosenoic acid, lignoceric acid, tetracosenic acid, and combinations thereof.

In an embodiment, the by-product comprises about 5 percent to about 80 percent by weight of $C_6$-$C_{24}$ fatty acids and salts thereof. The fatty acids may be saturated or unsaturated. Representative fatty acids include myristic acid, myristoleic acid, pentadecanoic acid, palmitic acid, palmitoleic acid, margaric acid, stearic acid, oleic acid, linoleic acid, linolenic acid, arachidic acid, behenic acid, eicosenoic acid, lignoceric acid, tetracosenic acid, and combinations thereof.

"Salts" refers to the inorganic base addition salts of the fatty acids described herein. Representative salts include sodium, lithium, potassium, calcium and magnesium salts.

The by-product can further include methanol, ethanol and/or glycerin. In an embodiment, the by-products can contain about 0.01 to about 15 weight percent of said methanol, ethanol and/or glycerin.

The by-products can further include one or more inorganic salts such as, for example, salts (e.g. chlorides and sulfates) of sodium, potassium and/or calcium. In an embodiment, the by-products can contain about 0.05 to about 15 weight percent of the inorganic salts.

Other components can include moisture (e.g. water), and unsaponifiable matter.

In an embodiment, the by-product comprises about 20 to about 95 weight percent of fatty acid methyl esters, about 5 to about 80 weight percent fatty acids and salts thereof and about 5 to about 20 weight percent of one or more components selected from inorganic salts, methanol, ethanol, glycerin, glycerides, unsaponifiable materials and combinations thereof.

The coating composition may suitably be applied to any organic or inorganic particulate solid capable of caking or generating dust when disturbed, handled or processed.

In some embodiments, the particulate materials are selected from coal, wood chips, fertilizers, soil, dirt and aggregates.

In other embodiments, the particulate materials are selected from fertilizers.

Typical fertilizers include monoammonium sulfate ("MAP"), diammonium phosphate ("DAP"), trisuperphosphate ("GSTP"), calcium phosphate, ammonium nitrate, potassium nitrate, potassium chloride, potassium sulfate, and the like, and blends thereof. The fertilizer may be in granular, palletized, crushed, compacted, crystalline or prilled form.

The coating oil composition is applied to the particulate solid in an amount sufficient to at least partially coat the particulate material and reduce dust formation and/or caking of the particulate solid.

In an embodiment, about 0.3 gallons to about 0.9 gallons of by-product is applied per ton of particulate material or fertilizer, wherein the by-product comprises about 20 percent to about 95 percent by weight of said fatty acid esters and about 5 percent to about 80 percent by weight of said fatty acids.

In an embodiment, coating oil composition is formulated as an aqueous emulsion. The emulsion may be formed by mixing the by-product, water and caustic or one or more surfactants. In an embodiment, the caustic is sodium hydroxide. In an embodiment, the aqueous emulsion comprises about 40 to about 60 weight percent of said by-product. In an embodiment, the emulsion is formed by mixing approximately equal portions by weight of by-product and water and up to about 10 percent by weight of sodium hyrdroxide, based on the total weight of the emulsion.

The coating oil composition may be applied to the particulate material by any of the known methods of applying a liquid to a particulate solid substrate including spraying, film rolling, spraying the composition onto a rotary drum onto which the particulate solid is dropped, and the like.

The foregoing may be better understood by reference to the following example, which is presented for purposes of illustration and is not intended to limit the scope of the invention.

EXAMPLE

Lab tests are conducted utilizing 3 3600-gram samples of palletized fertilizer. Sample 1 is uncoated. Sample 2 is coated with 4.3 grams of Dustrol 3182, a commercially available petroleum based coating oil. Sample 3 is coated with 3.7 grams of a coating oil according to the invention comprising about 40% methyl and/or ethyl esters of fatty acids. Coated samples are prepared by spraying the coating oil onto the fertilizer sample and mixing.

Each sample is placed in a 4-inch diameter, 20-inch long cylinder and the cylinder is rotated at about 60 rpm. Any dust generated is collected on a filter, and weighed.

During the first week of measurement, dust collected from sample 1 is about three times by weight the dust collected from the two samples that are coated. Samples 2 and 3 both have approximately equivalent amount of dust collected. After 4 weeks, the samples are measured again for dust generation. Dust collected from sample 1 is highest by weight. Again samples 2 and 3 have approximately equivalent dust generation, less than sample 1, showing that the economical, environmentally friendly dust control composition of the invention behaves comparably to currently available, petroleum based coating compositions.

Changes can be made in the composition, operation, and arrangement of the method of the invention described herein without departing from the concept and scope of the invention as defined in the claims.

The invention claimed is:

1. A coating oil composition comprising a by-product from a biodiesel manufacturing process or transesterification reactions involving triglycerides, wherein said by-product comprises one or more $C_6$-$C_{24}$ fatty acids, the composition further comprising inorganic base addition salts of the one or more $C_6$-$C_{24}$ fatty acids, wherein said inorganic base addition salts are selected from the list consisting of sodium, lithium, potassium, and magnesium, the composition further comprising one or more $C_6$-$C_{24}$ fatty acid esters and at least one chloride salt or sulfate salt of sodium, potassium, calcium, or any combination thereof, the coating oil composition also comprising one item selected from the list consisting of:
   a) the reaction product of an acid that has been reacted with the crude glycerin phase of a biodiesel manufacturing process,
   b) the reaction product of an acid that has been reacted with the crude glycerin phase of transesterification reactions involving triglycerides,
   c) the crude fatty acid alkyl ester phase of a biodiesel manufacturing process, and
   d) the crude fatty acid alkyl ester phase of transesterification reactions involving triglycerides.

2. The coating oil composition of claim 1 wherein said by-product comprises about 20 percent to about 95 percent by weight of said fatty acid esters.

3. The coating oil composition of claim 2 wherein said by-product comprises about 5 percent to about 80 percent by weight of said fatty acids and salts thereof.

4. The coating oil composition of claim 3 wherein said $C_6$-$C_{24}$ fatty acids and $C_6$-$C_{24}$ fatty acid esters are selected from the group consisting of myristic acid, myristoleic acid, pentadecanoic acid, palmitic acid, palmitoleic acid, margaric acid, stearic acid, oleic acid, linoleic acid, linolenic acid, arachidic acid, behenic acid, cicosenoic acid, lignoceric acid, tetracosenic acid, and methyl and ethyl esters thereof.

5. The coating oil composition of claim 4 further comprising one or more components selected from the group consisting of glycerin, glycerides, unsaponifiable material, methanol, ethanol and inorganic salts.

6. The coating oil composition of claim 1 in the form of an aqueous emulsion.

7. The coating oil composition of claim 6 wherein said aqueous emulsion comprises about 40 to about 60 weight percent of said by-product.

8. A method of controlling the generation of dust from particulate materials comprising applying to said particulate materials an effective dust-controlling amount of a composition comprising a by-product from a biodiesel manufacturing process or transesterification reactions involving triglycerides, wherein said by-product comprises one or more $C_6$-$C_{24}$ fatty acids, the composition further comprising salts of the one or more $C_6$-$C_{24}$ fatty acids, wherein said salts of said $C_6$-$C_{25}$ fatty acids are selected from the list consisting of sodium, lithium, potassium, and magnesium, the composition further comprising one item selected from the list consisting of:
   a) the reaction product of an acid that has been reacted with the crude glycerin phase of a biodiesel manufacturing process,
   b) the reaction product of an acid that has been reacted with the crude glycerin phase of transesterification reactions involving triglycerides,
   c) the crude fatty acid alkyl ester phase of a biodiesel manufacturing process, and
   d) the crude fatty acid alkyl ester phase of transesterification reactions involving triglycerides.

9. The method of claim 8 wherein said by-product comprises about 20 percent to about 95 percent by weight of said fatty acid esters.

10. The method of claim 9 wherein said by-product comprises about 5 percent to about 80 percent by weight of said fatty acids and salts thereof.

11. The method of claim 10 wherein said $C_6$-$C_{24}$ fatty acids and $C_6$-$C_{24}$ fatty acid esters are selected from the group consisting of myristic acid, myristoleic acid, pentadecanoic acid, palmitic acid, palmitoleic acid, margaric acid, stearic acid, oleic acid, linoleic acid, linolenic acid, arachidic acid, behenic acid, eicosenoic acid, lignoceric acid, tetracosenic acid, and methyl and ethyl esters thereof.

12. The method of claim 11 wherein said by-product further comprises one or more components selected from the group consisting of glycerin, glycerides, unsaponifiable material, methanol, ethanol and inorganic salts.

13. The method of claim 8 wherein said by-product is in the form of an aqueous emulsion.

14. The method of claim 13 wherein said aqueous emulsion comprises about 40 to about 60 weight percent of said by-product.

15. The method of claim 8 comprising applying to said particulate material about 0.3 gallons to about 0.9 gallons of said by-product per ton of said particulate material, wherein said by-product comprises about 20 percent to about 95 percent by weight of said fatty acid esters and about 5 percent to about 80 percent by weight of said fatty acids.

16. The method of claim 8 wherein said particulate material comprises fertilizer.

17. A coated particulate solid comprising particles having an outer surface at least partially coated with a coating oil composition, the coating oil composition comprising a by-product from a biodiesel manufacturing process or transesterification reactions involving triglycerides, wherein said by-product comprises one or more $C_6$-$C_{24}$ fatty acids, the composition further comprising salts of the $C_6$-$C_{24}$ fatty acids, wherein said salts of said $C_6$-$C_{24}$ fatty acids are selected from the list consisting of sodium, lithium, potassium, and magnesium, the composition further comprising one or more $C_6$-$C_{24}$ fatty acid esters and at least one chloride salt or sulfate salt of sodium, potassium, calcium, or any combination thereof, the composition also comprising one item selected from the list consisting of:
- a) the reaction product of an acid that has been reacted with the crude glycerin phase of a biodiesel manufacturing process,
- b) the reaction product of an acid that has been reacted with the crude glycerin phase of transesterification reactions involving triglycerides,
- c) the crude fatty acid alkyl ester phase of a biodiesel manufacturing process, and
- d) the crude fatty acid alkyl ester phase of transesterification reactions involving triglycerides.

18. The coated particulate solid of claim 17 wherein said particles comprise fertilizer.

* * * * *

UNITED STATES PATENT AND TRADEMARK OFFICE
CERTIFICATE OF CORRECTION

PATENT NO. : 8,163,059 B2
APPLICATION NO. : 11/673747
DATED : April 24, 2012
INVENTOR(S) : Bo L. Tran et al.

Page 1 of 1

It is certified that error appears in the above-identified patent and that said Letters Patent is hereby corrected as shown below:

1) In Column 4, Line 35, the word "palletized" should instead be "pelletized".
2) In Column 4, Line 66, the word "palletized" should instead be "pelletized".

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*